United States Patent [19]

Cochran et al.

[11] Patent Number: 4,957,750

[45] Date of Patent: Sep. 18, 1990

[54] MICROWAVEABLE BAKED GOODS

[75] Inventors: Stuart A. Cochran, East Windsor; David A. Cin, Cranbury, both of N.J.; Susan K. Veach, Petaluma, Calif.

[73] Assignee: Kraft General Foods, Glenview, Ill.

[21] Appl. No.: 348,326

[22] Filed: May 5, 1989

[51] Int. Cl.$^5$ .......................... A21D 2/36; A21D 2/28
[52] U.S. Cl. ........................... 426/19; 426/21; 426/23; 426/549
[58] Field of Search ...................... 426/19, 21, 23, 549

[56] References Cited

U.S. PATENT DOCUMENTS

| | | |
|---|---|---|
| 3,053,666 | 9/1962 | Henika .............................. 426/19 X |
| 3,803,326 | 4/1974 | Craig et al. ...................... 426/583 X |
| 4,643,900 | 2/1987 | Porter ................................ 426/19 X |

Primary Examiner—Joseph Golian
Attorney, Agent, or Firm—Thomas R. Savoie; Daniel J. Donovan

[57] ABSTRACT

The invention describes refrigerated, frozen or shelf stable, improved baked goods which will substantially retain palatability upon microwave heating. The improvement is accomplished by the incorporation into the baked good dough formulation of an effective amount of a protein modifier which contains free sulfhydryl groups. L-cysteine is a preferred protein-modifier which is incorporated into a dough at a preferred level of 220 ppm (baker's percent). Other protein modifiers may substitute for all or a portion of L-cysteine at a level based on their sulphydryl content.

14 Claims, No Drawings

MICROWAVEABLE BAKED GOODS

TECHNICAL FIELD

This invention relates generally to farinaceous, leavened baked goods. More particularly, the invention relates to shelf-stable, refrigerated or frozen baked good products which when warmed or heated in a microwave oven will retain its palatability. Specifically, the warmed or heated product will possess a crust and a crumb having a texture more closely equivalent to the freshly baked product.

BACKGROUND ART

The modern consumer of processed food is seeking to achieve a high quality food product with a minimum of preparation. This desire has led to the widespread utilization of processed foods and microwave ovens in the average American household.

It is commonplace to warm or heat various pre-baked baked goods prior to serving for consumption. Such a heating step could be considered somewhat optional for shelf-stable or refrigerated baked goods, but is required for frozen baked goods. It would also be required to heat baked goods, such as pizza shells, which serve as a crust for various toppings and are served hot from an oven.

While microwave energy will rapidly heat most food products, not all microwave heated products are able to deliver the same quality as is characteristic of the more traditional conduction oven heated counterpart. This lack of quality is quite prevalent in the area of microwave reheated baked goods. Problems have arisen with the use of microwave energy for heating wheat-based food products, such as bread and roll products. Bread and roll produCts are known to become unpalatable after short exposure to microwave energy. The term "palatable" or "palatability" refers to the eating quality of food products. Palatable food products are agreeable to the taste and possess an appetizing appearance and texture. "Bread" and "roll" products are meant to refer to fully-baked, leavened, baked goods, which can be a variety of forms including bread loaves, dinner rolls, pizza crusts, bagels, etc.

Upon exposure to microwave energy, the crust of bread and roll products becomes extremely tough and/or soggy as the water present within the baked good migrates to the surface crust but does not evaporate. The crust of such microwave-exposed products may become so tough that it is difficult to tear such products. The bread product itself may become soggy or develop hard lumpy portions. The crumb of the products becomes rubbery and gummy and is difficult to chew. Consequently, bread and roll products upon exposure to microwave energY are not palatable.

U.S. Pat. Nos. 4,560,559 and 4,463,020 to Ottenberg discuss the preparation of yeast-raised, wheat-based food products having improved resistance to the deterioration caused by microwave heating. The earlier patent accomplished this improvement by the incorporation of from about 5 to about 60 percent by weight of the weight of the wheat flour of a long-grain rice flour. The later patent accomplished the improvement by the incorporation of a similar amount of a rice starch, corn starch or wheat starch possessing an average crystal size less than 20 microns.

U.S. Pat. No. 4,885,180 to Cochran et. al., discloses improved shelf-stable, refrigerated or frozen baked goods having improved microwave tolerance as a result of the addition of a chemically-modified starch to the dough composition. A chemically-modified starch, preferably potato starch, is incorporated into the dough at from 5 to 30 bakers' percent.

There is, however, a need in the food art to find additional or alternative techniques for producing shelf-stable, refrigerated or frozen baked goods, which will substantially retain their palatability upon microwave warming or heating. In the case of frozen baked goods which are to be microwave-heated, it would be beneficial if the product could be taken out of the freezer and immediately heated by microwave energy without the need of defrosting or thawing prior to microwaving.

The practice of this invention is effected by the use of high levels of reducing agents which are known in the art as ingredients which function as dough conditioners and which reduce the mix-time required to develop a dough. U.S. Pat. No. 3,053,666 to Henika et al. discloses the use of L-cysteine and related compounds for this purpose in combination with high levels of oxidizing agents such as potassium bromate. The use of onion and garlic powder in place of L-cysteine is disclosed in U.S. Pat. No. 4,643,900 to Porter. None of this prior art, however, relates to improving the microwaveability of baked goods.

DISCLOSURE OF THE INVENTION

The present invention relates to improved shelf-stable, refrigerated or frozen baked goods which substantially retain palatability upon microwave reheating. The improvement is brought about by the incorporation into the baked goods of an effective amount of a protein modifier, the amount being effective to reduce deteriorization in the palatability of the baked good upon microwave heating.

The protein modifier, as used in this invention, is a food-acceptable, reducing agent containing free sulfhydryl groups which are able to break the disulfied bonds of the gluten structure contained in the bread or roll product. L-cysteine is a suitable material for use as a protein modifier and, when L-cysteine is the sole protein modifier employed, it should be used as an ingredient in the dough at a level of at least 150 parts per million (PPM) by weight of the flour contained in the dough (0.015 bakers' percent). A suitable range for L-cysteine is 0.015 to 0.040 preferablY 0.015 to 0.030 and, most preferably, 0.018 to 0.0022 bakers' percent. A preferred level for L-cysteine is about 0.02 bakers' percent.

Other protein modifiers or protein modifier-containing materials may be substituted for all or a portion of L-cysteine. As the ability of these materials, such as glutathione, sulfite salts (e.g., sodium bisulfite, potassium bisulfite, sodium sulfite and potassium sulfite), garlic (e.g., garlic powder), onion, dry yeast, unheated soy flour and the like, to break disulfide bonds will not be the same, one to another, on a weight basis, the limits of this invention are best set forth in terms of a minimum effective level of L-cysteine - namely, 0.015 baker's percent. Thus, any combination of protein modifiers which will contain free sulfhydryl groups in an amount equivalent to 0.015 baker's percent of L-cysteine will be within the scope of this invention. Of course, compounds related to L-cysteine, such as L-cysteine hydrochloride, L-cysteine monophosphate, di-L-cysteine sulfate, L-mono-cysteine tartrate and homocysteine can also be used.

DESCRIPTION OF PREFERRED MODES FOR CARRYING OUT THE INVENTION

The protein-modifier is preferably incorporated into the baked good at a level, on an L-cysteine basis, of from about 150 to about 400 parts per million (ppm), most preferably from about 180 to 220 ppm. Unless otherwise noted, all weight percentages refer to bakers' percents, wherein the weight of each non-flour ingredient contained in the baked good formulation is expressed as a weight percent of the flour ingredient of the formulation. The bottom end of the range is limited by the amount of the protein modifier which is necessarY to provide significant resistance to the deterioration in palatability upon exposure of the food product to microwave energy. The upper end of the addition range of greater than 400 ppm should be avoided as excessive breakdown of the dough gluten structure will result.

In accordance with the present invention, the farinaceous baked good is made by prePcaring the dough by conventional means and techniques. The use of a straight dough process or sponge dough process, a brew process or other dough production techniques which include the use of a preliminary fermentation step are suitable for use with this invention. All standard formulations may be utilized with the only exception that the protein modifiers heretofore described are incorporated into the formulations. High levels of oxidizing agents (e.g. potassium bromate, potassium iodate, calcium peroxide, potassium persulfate and the like) are not required for this invention. Conventional levels of less than 0.02% of oxidizing agents, usually potassium bromate may be present in the dough formulation. The use of straight dough and sponge dough methods and other dough production techniques which include the use of preliminary fermentation step are suitable for us with this invention.

With each formulation, the mixing, fermentation, shaping, proofing and baking steps are handled as is customary to a skilled artisan in the trade. All standard dough systems, straight, sponge, no-time and liquid ferment can be utilized with the present invention. After the dough is prepared and/or proofed, the product is baked for the appropriate time and temperature to achieve a complete bake.

The baked good product may be yeast-leavened and/or it may include chemical leavening agents within the dough. Various flours can be used to form the baked goods product of the present invention. Examples of such flours are those conventionally used in the baking industry, including bread flour, corn flour, potato flour and pastry flour.

Other conventional ingredients that may be included in the baked good formulations include shortening or lubricating agents, starch, salt, nonfat dry milk; whole eggs, dried eggs or dried egg yolk; flavoring agents which include natural and synthetic flavorings; food coloring; minerals and vitamins.

The baked good product which contains the protein modifier may be shelf-stable, refrigerated or frozen. Shelf-stable for purposes of this invention shall refer to baked goods which are distributed and sold to the ultimate consumer without being refrigerated or frozen. Preferably, baked good products are frozen and the consumer would simply remove the frozen baked good products from a food freezer and place it directly into a microwave oven without the need to thaw or defrost. The improvement associated with the Present invention, which is brought about by the incorporation of protein modifiers makes all baked goods tolerant to microwave reheating. The produCt should be microwave heated for a period of time sufficient to warm it to the proper serving temperature, typically ranging up to 3 minutes for frozen baked goods, depending on the power setting, quantity of product to be reheated and wattage of the particular oven. Longer heating period could be necessary for such products as frozen pizza shells which are topped with additional food ingredients, such as cheese, meats and/or vegetables.

This invention is further described but not limited to the examples set forth below.

EXAMPLE 1

Pizza doughs were made according to the following formulas:

| Ingredient | Bakers' Percent | | |
| --- | --- | --- | --- |
| | A | B | C |
| High Gluten Flour | 100 | 100 | 100 |
| Compressed Yeast | 2.75 | 2.75 | 2.75 |
| Water | 66.0 | 66.0 | 66.0 |
| Salt | 2.2 | 2.2 | 2.2 |
| Sugar | 1.65 | 1.65 | 1.65 |
| Modified Starch | 10.0 | 10.0 | 10.0 |
| Emulsifier | 1.0 | 1.0 | 1.0 |
| Olive Oil | 2.2 | 2.2 | 2.2 |
| Conditioner | 0.25 | 0.25 | 0.25 |
| L-Cysteine | — | 100 ppm | 200 ppm |
| Potassium Bromate | — | 60 ppm | 60 ppm |

The dough ingredients were mixed for two minutes at low speed and then at a higher speed for 9 minutes in the case of dough A and four minutes in the case of doughs B and C. The doughs were then divided, formed, and proofed for 45 minutes at 90° F. (32.2° C.) and 70% relative humidity. The pizza shells were then baked at 470° F. (243.3° C.) for 4.5 minutes and then frozen and stored at about −5° F. (−20.6° C.). After one-week frozen storage, the shells were topped with cheese, tomato sauce and pepperoni, placed in microwave susector bags and heated in a microwave at high power for 2.5 minutes. After sitting for two minutes, the texture of the pizza crusts was evaluated organoleptically by a panel of food technologists. Crusts A were rated as being tough and chewy; crusts B were rated as being slightly less tough than crusts A; and crusts C were rated best and having only minimal toughness.

EXAMPLE 2

A pizza dough was made according to the following formulas:

| Ingredient | Bakers' Percent |
| --- | --- |
| High Gluten Flour | 100 |
| Compressed Yeast | 2.75 |
| Water | 66.0 |
| Salt | 2.2 |
| Sugar | 1.65 |
| Modified Starch | 10.0 |
| Emulsifier | 1.0 |
| Olive Oil | 2.2 |
| Deodorized Garlic Powder | 0.50 |
| L-Cysteine | 90 ppm |
| Potassium Bromate | 30 ppm |

The ingredients were mixed for two minutes at speed 1 and 5 minutes at speed 2 in an unjacketed McDuffy ™ bowl. The resulting dough was at a temperature of about 77° F. The dough was benched for 60 minutes to permit fermentation, divided, rounded, and thereafter proofed for 45 minutes at 90° F. (32.2° C.) and 85% relative humidity. The Pizza shells were then baked for 5 minutes at 475° F. (246.1° C.), cooled, frozen and stored at −5° F. (−20.6° C.) for one week. Upon removal from frozen storage, crusts heated in a microwave oven are comparable in texture to crusts heated in a conventional oven.

EXAMPLE 3

Bagel doughs were made according to the following formulas:

| Ingredient | Bakers' Percent A | B |
|---|---|---|
| Flour | 100 | 100 |
| Modified Starch | — | 10 |
| Sugar | 3.0 | 3.4 |
| Salt | 2.0 | 2.2 |
| Shortening | 3.0 | 3.4 |
| Yeast | 2.0 | 2.3 |
| Gluten | — | 2.5 |
| L-Cysteine | — | 200 ppm |
| Water | 51.5 | 58.0 |

The salt and sugar were dissolved in water and mixed in an unjacketed McDuffy ™ bowl and then with the other dough ingredients for two minutes at low speed and ten minutes at high sPeed. The doughs were subdivided (70 gram pieces), shaped into bagels and retarded at 45° F. (7.2° C.) overnight. Thereafter, the bagels were warmed at room temperature for 20 minutes, boiled in water for one minute on each side, dried for about five minutes and baked at 400° F. (204.4° C.) for eight minutes in an impingement oven. After baking, the bagels were cooled and then frozen. After three days' frozen storage, the bagels were removed from the freezer and placed directly into a 750 watt microwave (high power) for 45 seconds. Bagels B were organoleptically evaluated as being significantly more tender and crisp than bagels A.

EXAMPLE 4

Puff pastry doughs were made according to the following formulas:

| Ingredient | Bakers' Precent A | B |
|---|---|---|
| Flour | 100 | 100 |
| Water | 61 | 64 |
| Salt | 1.5 | 1.5 |
| Non-Fat Dry Milk Solids | 2.0 | 2.0 |
| Shortening | 10.0 | 10.0 |
| Modified Starch | — | 10.0 |
| L-Cysteine | — | 90 ppm |
| Deodorized Garlic | — | 0.5 |

-continued

| Ingredient | Bakers' Precent A | B |
|---|---|---|
| Powder (8–10 moisture) | | |

The dough ingredients were mixed and the doughs were selected, laminated with a 25% margarine roll-in, baked, cooled and frozen. After three days' frozen storage and microwave heating, the pastries based on formula B exhibit superior organoleptic texture to the pastries based on formula A.

We claim:
1. A baked good which will have improved palatability upon microwave heating, the improvement comprising the addition of protein modifier to the dough used to produce the baked good, said protein modifier being added at a level which will provide an amount free sulfhydryl group equivalent to 180–400ppm (flour basis) of L-cysteine and effective to reduce deterioration in the palatability of the baked good upon microwave heating.
2. The product of claim 1 wherein the level is from 180 to 220 ppm.
3. The product of claim 1 wherein the level is about 200 ppm.
4. The product of claim 1 wherein the protein-modifier comprises L-cysteine, L-cysteine related compounds and/or garlic powder.
5. The product of claim 1 wherein the protein modifier consists of L-cysteine and garlic powder.
6. The product of claim 5 wherein the garlic powder is deodorized garlic powder.
7. The product of claim 5 wherein L-cysteine is present at a level of 90 ppm.
8. The product of claim 1 wherein the improved baked good is a frozen baked good.
9. The product of claim 1 wherein the dough contains less than 20 ppm of oxidizing agents.
10. A process for making improved, yeast-leavened, baked goods which will have improved palatability upon microwave heating comprising the step of:
   (a) formulating a dough containing flour water, yeast and protein modifier, said protein modifier being added at a level which will provide an amount of sulphydryl groups equivalent to 180–400 ppm (flour basis) of L-cysteine and effective to reduce deterioration in the palatability of the baked goods upon microwave heating;
   (b) fermenting the yeast contained in the dough formulation; thereafter
   (c) dividing, molding and proofing the resulting dough pieces; and thereafter
   (d) baking the proofed dough pieces
11. The process of claim 10 wherein the baked dough is frozen and distributed as a frozen product.
12. The process of claim 10 wherein the dough is prepared by a sponge dough process, a straight-dough process or a brew process.
13. The process of claim 10 wherein the protein modifier comprises L-cysteine, L-cysteine-related compounds and/or garlic powder.
14. The process of claim 12 wherein the protein modifier consists of L-cysteine and deodorized garlic powder.

* * * * *